United States Patent [19]

Le Marchand et al.

[11] Patent Number: 4,691,809
[45] Date of Patent: Sep. 8, 1987

[54] DISC BRAKE WITH AUTOMATIC ADJUSTMENT

[75] Inventors: Claude Le Marchand, Domont; Jean-Louis Gerard, Paris, both of France

[73] Assignee: Bendix France, Paris, France

[21] Appl. No.: 844,487

[22] Filed: Mar. 26, 1986

[30] Foreign Application Priority Data

Mar. 27, 1985 [FR] France ............................... 85 04556

[51] Int. Cl.⁴ ............................................. F16D 65/56
[52] U.S. Cl. .................................. 188/71.9; 188/196 D
[58] Field of Search .............. 188/71.9, 196 D, 196 F, 188/196 BA

[56] References Cited

U.S. PATENT DOCUMENTS 3,952,845  4/1976  Asquith ........................ 188/71.9 X
4,246,985  1/1981  Shimizu et al. .................... 188/71.9

FOREIGN PATENT DOCUMENTS 2004007  3/1979  United Kingdom .

Primary Examiner—Duane A. Reger
Attorney, Agent, or Firm—Larry J. Palguta; Ken C. Decker

[57] ABSTRACT

The invention relates to a disc brake with automatic adjustment, of the type incorporating a calliper (10), a brake actuator (12) which is adapted to act directly upon a first friction component (14) and, by reaction through the calliper (10) upon a second friction component (16). The brake actuator (12) incorporates a mechanical control (32) acting upon a hydraulic control piston (20) through an automatic adjustment device, the latter being formed by a screw and nut device (46, 60) with reversible pitch which is actuatable by the hydraulic piston (20) beyond a predetermined travel of the latter which is defined by a clearance between an annular component (82) and a thrust bearing (92) which is adapted to act upon the screw and nut device (46, 60), the clearance being capable of varying as a function of the pressure applied to the control piston (20). According to the invention, the annular component (82) is movable axially relative to the control piston (20) by means of a monitoring piston (64) when a predetermined control pressure is reached.

4 Claims, 2 Drawing Figures

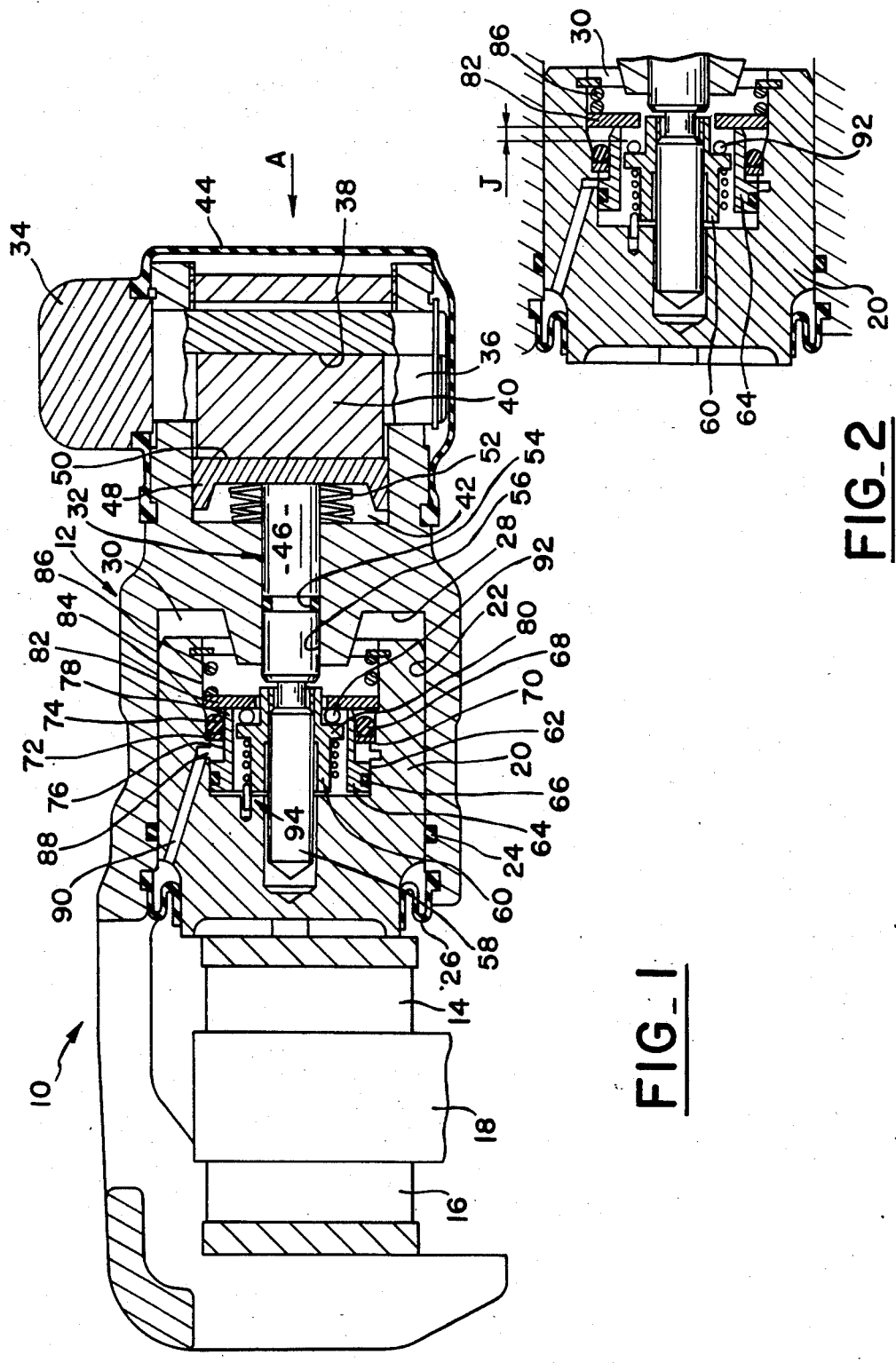

DISC BRAKE WITH AUTOMATIC ADJUSTMENT

The invention concerns a disc brake with automatic adjustment for use on motor vehicles.

The invention concerns more particularly a disc brake of the type with a sliding calliper incorporating a brake actuator which is operable independently either by fluid pressure or by a mechanical control. Operation of the brake actuator causes it to push directly upon a first friction component which is in frictional engagement with a first surface of a rotating disc and, by reaction through the sliding calliper, upon a second friction component which is in frictional engagement with a second surface of the disc opposite the first surface. The calliper slides relative to a fixed support which carries directly or indirectly the torque generated by the friction components. In brakes of this type, taking account of the initial thickness of the friction components, it is necessary to have an automatic adjustment device situated on the mechanical control in such a way that the travel of this control does not increase as a function of the wear of the friction components. A number of solutions have been proposed to resolve this problem. However, these systems generally have the disadvantage of providing an adjustment irrespective of the action which caused operatiobn of this automatic adjustment. This type of device operates not only in order to compensate for wear of the friction components, which is normal, but also to compensate for the elastic distortion of the calliper at high hydraulic control pressures, this type of device necessitates a relatively large dead travel which does not cause the automatic adjustment to intervene and which is of the order of the deformation of the calliper observed during its operation. In order to resolve this problem, the applicant company proposed in French Patent App. No. 71.00748 published under the No. 2.075.425 a disc brake of this type in which the automatic adjustment is neutralized when the control pressure reaches a predetermined value by means of an enclosure which is filled with compressible material and is capable of deforming elastically under the action of the fluid pressure, this enclosure, by deforming elastically, increases the dead travel beyond the predetermined pressure which does not allow the automatic adjustment to intervene and prevents compensation for the elastic deformation of the calliper for high hydraulic control pressures.

Although this solution deals with the problem raised it has the following disadvantages: the elastic enclosure which is being deformed continuously by pressure, in time develops fatigue of the materials forming it which may result in rupture of the latter and the desired effect is not only lost but in addition a rupture of this enclosure introduces a considerable volume of gas into the hydraulic circuit which can lead to the loss of braking capability of the brake, and also the manufacture of such an enclosure presents difficulties resulting in appreciable variations which can affect the balance of the braking torques of two wheels on the same axle, and lastly for this type of device it is not easy to vary the value of the hydraulic pressure for which it is desired to prevent the operation of the automatic adjustment.

The object of the present invention is to provide a disc brake of the type described above in which these disadvantages are overcome while retaining the advantages of the latter, by utilizing proven technology, with easy manufacture and consequently an advantageous overall cost.

According to the invention there is provided a disc brake with automatic adjustment of the type incorporating a calliper, a brake actuator which is adapted to act directly upon a first friction component and, by reaction through the calliper, upon a second friction component, the brake actuator incorporating a mechanical control acting upon a hydraulic control piston through an automatic adjustment device, the adjustment device being formed by a screw and nut device with reversible pitch which is operable by the hydraulic piston beyond a predetermined travel of the latter which is defined by a clearance between an annular component and a thrust bearing which is adapted to act upon the screw and nut device, the clearance being capable of varying as a function of the pressure applied to the control piston, characterized in that the annular component is movable axially relative to the control piston by means of a monitoring piston when a predetermined control pressure is reached.

It will be understood that owing to such a construction, the dead travel is controlled by the movement annular component, this movement being monitored by a monitoring piston, of conventional technology, whose active cross-section is easily modified so as to adjust the movement of the annular component as a function of the desired pressure, this active cross-section will not change with time and consequently the reliability of the system is ensured.

Other characteristics and advantages of the disc brake, the subject of the present invention, will emerge from study of the detailed description of the brake with reference to the accompanying drawings in which:

FIG. 1 is a sectional view of a brake calliper constructed in accordance with the present invention; and FIG. 2 is a partial sectional view of the brake shown in FIG. 1 when the predetermined pressure has been exceeded.

The disc brake shown in FIG. 1 incorporates a sliding calliper shown as an assembly by the reference 10 which is mounted on a fixed component or support (not shown) which is capable of being fixed to a fixed portion of the vehicle (not shown). The calliper 10 incorporates a brake actuator shown as an assembly by the reference 12 which is adapted to act directly upon a first friction component 14 and indirectly, through the sliding calliper, upon a second friction component 16 so as to push the latter components into frictional engagement with a rotating disc 18. The brake actuator 12 incorporates a hydraulic control and a mechanical control as will be described in greater detail.

In a conventional manner, the hydraulic control is provided by a hydraulic control piston 20 which is slideably mounted in a bore 22 formed in the brake actuator 12. Sealing between the piston 20 and the bore 22 is provided by a seal 24, the piston also being protected by a piston cap 26. The piston 20 and a wall 28 at the bottom of the bore 22 define a chamber 30 which is intended to be connected to a suorce of pressure (not shown) such as for example the master cylinder of the vehicle.

The mechanical control, shown as an assembly by the reference 32, is provided by means of a lever 34 which is intended to be connected to a cable or similar device (not shown) and is firmly fixed to a shaft 36 in which a groove 38 is formed housing a link 40. The shaft 36 is housed in two bores which are formed in the brake actuator and is immobilized longitudinally relative to the actuator by means of a shoulder formed on the lever 34 on each side by means of a circlip or similar device. The shaft 36 and the link 40 are housed in a blind bore 42 formed in the brake actuator, the open portion of the bore being provided with a plug and the assembly is protected by a flexible cap 44. The bore 42 also houses a screw 46 of which an enlarged portion 48 incorporates a groove 50 which cooperates with the link 40. A return spring 52 is positioned between the bottom of the blind bore 42 and the enlarged portion 48. The screw 46 incorporates a cylindrical portion in which a groove is formed incorporating a seal 54. This seal 54 and the cylindrical portion of the screw 46 are capable of sliding relative to a bore 56 formed in the body of the brake actuator. The screw 46 extends into the chamber 30 by means of a threaded portion 58 with reversible pitch on which nut 60 is mounted. The hydraulic control piston 20 incorporates a bore 62 in which a monitoring piston 64 is mounted and is slideably and sealingly housed in this bore 62 by means of a seal 66. The hydraulic piston 20 incorporates a second bore 68 of a diameter which is greater than the diameter of the bore 62, the step from one diameter to the other forming a wall 70 which is directed towards the chamber 30. A washer 72 is held against this wall 70 which limits the movements to the left in FIG. 1 of a seal 74 which is situated between the bore 68 and an external surface 76 which is formed on an extension 78 of the monitoring piston 64, this extension 78 passing freely around a collar 80 formed on the nut 60. The end of the extension 78 of the monitoring piston 64 bears axially against an annular component 82 which is mounted in a third bore 84 in the control piston 20. On the same side as the chamber 30, the annular component 82 is pushed to the left in FIG. 1 by means of a spring 86 whose other end bears against a circlip or similar device which is firmly fixed to the piston 20. The annular component 82 is capable of sliding in the bore 84 owing to the spring 86. In particular, at rest, as shown in FIG. 1, the spring 86 pushes the annular component 82 to the left in FIG. 1 which itself pushes the monitoring piston 64 to the left so as to come to bear against the bottom of the bore 62. A chamber 88 is formed between the bore 62, the piston 64 and the steal 74, the chamber 88 being connected to the atmosphere by means of a passage 90. A ball thrust bearing 92 is situated between the collar 80 of the nut 60 and the annular component 82 allowing an axial clearance J between the collar 80 and the annular component 82 defining the operational clearance at rest; this clearance J is very small and is only shown, as is described below, in FIG. 2 in which this clearance J is sufficiently enlarged to be visible. The collar 80 and the annular component 82 form a rolling track for the thrust bearing 92. The nut 60 is connected to the piston 20 through a unidirectional clutch which is given as an assembly the reference 94 and is formed in the embodiment shown by a clutch spring which is mounted on a cylindrical surface of the nut 60 and of which one end enters into a hole in the piston 20. The monitoring piston 64 forms a differential piston in that, firstly, it slides on the bore 62 of the piston 20 and the seal 66, and secondly the diameter 76 of its extension 78 cooperates with the seal 74.

The brake which is described above with the aid of FIG. 1 operates in the following manner:

At rest, the different components of the brake occupy the positions shown. When the brake is operated by means of the mechanical control, the lever 34 and the shaft 36 push the link in a general direction shown by the arrow A. Through the groove 50 the link 40 pushes the enlarged portion 48 of the screw 46 against the spring 52. As the cylindrical portion of the screw can slide relative to the bore 56 formed in the brake actuator, the screw 46 also moves in the direction of the arrow A. This movement of the screw 46 is transmitted to the nut 60 by means of the threaded portion 58, the rotation of the nut 60 being prevented by the unidirectional clutch 94, and the nut 60 comes to bear against the control piston 20. The force of the link 40 is thus transmitted to the friction component 14 and by the reaction of this friction component against the disc 18 another reaction appears against the shaft 36 which drives the calliper 10 so as to slide in the direction opposite to that shown by the arrow A which brings the friction component 16 into contact with the disc 18. When the manual control is released the different components of the brake regain the positions shown.

When the brake is operated by means of the hydraulic control, hydraulic pressure is applied to the chamber 30 in such a way as to push the piston 20 to the left referring to FIG. 1. If the movement of the piston 20 relative to the nut 60 does not exceed the operational clearance defined between the ball thrust bearing 92, the annular component 82 and the collar 80, the movement of the piston 20 has no effect on the automatic adjustment. If the movement of the piston 20 is greater than the predetermined operational clearance the nut 60 is driven to the left by the piston 20 through the ball thrust bearing of the annular component 82 and through the spring 86, which is itself driven by the circlip which is firmly fixed to the piston. The screw 46 being immobilized axially by means of the spring 52, the nut 60 owing to the reversible pitch rotates relative to the screw 46 so as to be able to follow the movement of the piston 20, the unidirectional clutch 94 permitting this rotation. During this phase of operation, the monitoring piston 64 is always held against the bottom of the bore 62 and does not intervene with the annular component 82. If the hydraulic pressure is then released, in a conventional manner the seal 24 causes the piston 20 to return slightly, the unidirectional clutch 94 preventing rotation of the nut 60. As the nut rotated while moving to the left during the application of braking, the automatic adjustment device now occupies a new position which is offset to the left and prevents the piston 20 from regaining its initial position.

If, however, braking is not released immediately, the pressure in the chamber 30 continues to rise and under the effect of this pressure and of the force generated by the piston 20, the calliper deforms. It is then necessary to prevent operation of the adjustment before the mechanical deformation of the calliper commences.

When the pressure in the chamber 30 reaches the value defined by the active cross-section of the differential piston and by the force of the spring 86, the monitoring piston 64 moves under the effect of this pressure to the right in FIG. 1 and moves the annular component 82 against the spring 86 thus increasing the clearance of the ball thrust bearing 92 between the collar 80 of the nut 60 and the annular component 82, and this increase in clearance prevents action of the annular component 82 upon the nut 60 and the automatic adjustment is neutralized, the nut 60 not being obliged to follow the movements of the piston 20. If the pressure continues to rise, the differential piston 64 moves further to the right in FIG. 1 against the spring 86 and completely frees the adjustment nut 60.

Referring to FIG. 2, in which the assembly of the automatic adjustment is shown when the pressure in the chamber 30 has exceeded the predetermined pressure, it will be seen that the differential piston 64 has moved to the right in this FIG. 2 by pushing the annular component 82 thus causing an operational clearance J to appear such that the annular component 82 cannot in any way act upon the thrust bearing 92 and thus upon the nut 60 of the automatic adjustment.

When the hydraulic pressure is released in the chamber 30, during a first stage the piston 20 moves to the right in FIGS. 1 or 2 owing to the elastic deformation of the calliper 10, then during a second stage this piston continues to move to the right but simultaneously the spring 86 moves to the left relative to the piston 20, the differential piston 64 which progressively regains its position shown in FIG. 1 bearing against the bottom of the bore 62 thus defining the rest position of the annular component 82, and lastly during a third stage in a conventional manner the seal 24 causes the piston 20 to return slightly to the right thus providing the initial operational clearance between the ball thrust bearing 92 and its two rolling tracks, that is to say the collar 80 of the nut 60 and the annular component 82.

As may be seen from the preceding description, the device which is the subject of the invention enables the operational clearance to be controlled by means of a differential piston which is simple and reliable, the increase of the operational clearance being such that for any pressure exceeding a predetermined value the differential piston moves in relation to the pressure existing in the chamber 30 and consequently the additional consumption of fluid due to the movement of the differential piston is progressive as a function of the hydraulic pressure applied, thus allowing the pedal travel to be reduced for all intermediate pressures between the initial position and the position for which the differential piston comes into abutment against the hydraulic piston 20 through the annular component 82 and through the spring 86 which is reduced to its solid length thus forming the abutment.

In addition, this construction allows the control piston to be mounted equipped with the nut and the differential piston, without modifying the machining of the brake actuator, and consequently a brake which is not equipped with the neutralizing device which is the subject of the present invention can accept, without modification, such a piston and can benefit from the advantages of the present invention. In fact, the assembly of the piston 20, the piston 64, the nut 60, the annular component 82 and the spring 86, forming a sub-assembly which is removable as a unit, may easily be mounted on an existing brake. Also this construction allows, by simple replacement of this equipped piston 20, the predetermined pressure to be varied by modifying either the characteristics of the spring 86 or the two diameters of the differential piston 64.

Clearly the invention is not limited to the embodiment described above and in particular, the spring 86 may be made from Belleville washers, the piston 20 may be equipped with a solid abutment for the annular component 82, and lastly the differential piston and particularly the seals of the latter may be constructed in any manner within the scope of a person versed in the art.

We claim:

1. A disc brake with automatic adjustment of the type including a caliper, a brake actuator which is adapted to act directly upon a first friction component and, by reaction through the caliper, upon a second friction component, the brake actuator including a mechanical control acting upon a hydraulic control piston by means of an automatic adjustment device, the automatic adjustment device formed by a screw and nut device with reversible pitch which is operable by the hydraulic control piston when the control piston travels beyond a predetermined distance defined by a clearance between an annular component and a thrust bearing, the thrust bearing adapted to act upon the screw and nut device and the clearance variable as a function of pressure applied to the control piston, characterized in that when a predetermined control pressure is reached said annular component is moved axially relative to said control piston by means of a monitoring piston slideably and sealingly mounted within said control piston, the annular component movable against a biasing force exerted by a resilient member engaging the annular component and the movement of the annular component neutralizing the automatic adjustment device, the monitoring piston engaging sealingly a surface of a bore in the control piston and within which the monitoring piston is disposed, and that for any control pressure which is less than said predetermined pressure, the predetermined distance is defined by said annular component coming to bear, by means of said resilient member, against the monitoring piston which bears axially against a bottom of the bore of the control piston and which houses said monitoring piston.

2. The disc brake according to claim 1, characterized in that said control piston, monitoring piston, annular component, and nut of the screw and nut device form an assembly which is removable as a unit.

3. The disc brake according to claim 1, characterized in that said monitoring piston and control piston have two seals therebetween and a chamber defined between the seals and pistons.

4. The disc brake according to claim 3, characterized in that one of the seals engages an abutment fixed relative to the control piston.

* * * * *